United States Patent [19]
Bayle

[11] Patent Number: 5,416,916
[45] Date of Patent: May 16, 1995

[54] STRUCTURE FOR ENABLING DIRECT MEMORY-TO-MEMORY TRANSFER WITH A FLY-BY DMA UNIT

[75] Inventor: Shawn D. Bayle, Chestnut Hill, Mass.

[73] Assignee: NEC Electronics Incorporated, Mountain View, Calif.

[21] Appl. No.: 12,613

[22] Filed: Feb. 2, 1993

Related U.S. Application Data

[63] Continuation of Ser. No. 549,329, Jul. 6, 1990, abandoned.

[51] Int. Cl.⁶ ............................................. G06F 13/00
[52] U.S. Cl. ................................. 395/425; 364/242.31; 364/DIG. 1
[58] Field of Search ............................... 395/425, 800; 364/242.31, DIG. 1

[56] References Cited

U.S. PATENT DOCUMENTS

| | | | |
|---|---|---|---|
| 4,481,578 | 11/1984 | Hughes et al. | 395/425 |
| 5,007,012 | 9/1988 | Dujari | 395/425 |
| 5,119,485 | 6/1992 | Ledbetter, Jr. et al. | 395/425 |
| 5,193,193 | 3/1993 | Iyer | 395/725 |

*Primary Examiner*—Alyssa H. Bowler
*Assistant Examiner*—John Harrity
*Attorney, Agent, or Firm*—Skjerven, Morrill, MacPherson, Franklin & Friel; Brian D. Ogonowsky

[57] ABSTRACT

In a microprocessor such as a Model V40 or V50, which includes a DMA unit but does not have direct memory-to-memory transfer capabilities, an external register is used and controlled by the DMA unit to temporarily store data from memory during a direct memory-to-memory transfer by the DMA.

8 Claims, 1 Drawing Sheet

STRUCTURE FOR ENABLING DIRECT MEMORY-TO-MEMORY TRANSFER WITH A FLY-BY DMA UNIT

This application is a continuation of application Ser. No. 07/549,329, filed Jul. 6, 1990 now abandoned.

FIELD OF THE INVENTION

This invention relates to direct memory address (DMA) controllers and in particular to a circuit for enabling a DMA controller to have a memory-to-memory transfer capability when one is not inherently provided in the DMA controller.

BACKGROUND OF THE INVENTION

Direct memory access (DMA) controllers are well known in the art. One such DMA controller is the μPD71071 manufactured by NEC Electronics Inc. Typically, a DMA controller is configured as a separated integrated circuit chip with input and output pins. The function of this discrete type of DMA controller is to provide high-speed data transfers between peripheral devices and memory or between one memory location and another memory location without the need for the central processor unit (CPU) itself to read or write any data. The DMA controller is programmed by the user with instructions identifying certain data to be transferred from one location to another. When the DMA controller is later given a simple data transfer request, the DMA controller carries out the programmed data transfer instructions. In this way, the CPU is free to perform other operations during the time when the DMA controller is transferring data from one location to another.

In a standard discrete DMA controller such as the μPD71071, a register is included within the DMA controller to temporarily store data during a memory-to-memory transfer. The data read from a source memory location must be temporarily stored in the register located inside the DMA controller until the address of the destination memory location has been provided on the address bus by the DMA controller, and the addressed memory location is ready to receive the data.

When a memory-to-input/output (I/O) device transfer is conducted, the data from the source memory may be applied directly to the input of the I/O device without temporarily storing the data, since no address bits are needed to address the selected I/O device. This is called fly-by DMA.

Additionally, data transfer from an I/O device to a memory location may also be conducted without temporarily storing the data, since once the memory location is addressed, the data from the I/O device may simply be directly read into the addressed location without the need for temporary storage by the CPU or DMA controller.

In microprocessors which include a CPU and a DMA controller, die area may be conserved by eliminating the temporary registers internal to the DMA controller which would be used for temporarily storing data during a direct memory-to-memory transfer. These microprocessors not containing temporary registers in the DMA controller, such as the Model V40 (μPD70208) or V50 (μPD70216) microprocessors by NEC Electronics Inc., are capable of providing direct memory-to-I/O device transfers or I/O device-to-memory transfers but not direct memory-to-memory transfers.

The microprocessors without this direct memory-to-memory transfer feature are generally satisfactory to a user who is willing to use some limited CPU time, and use the registers internal to the CPU, to route data between one memory location and another memory location. However, for some users, it is important that the CPU not expend even this limited CPU processing time conducting memory-to-memory transfers.

Thus, what is needed in the art is a circuit which can be used to quickly and easily enable microprocessors, such as the Model V40 and V50, to have direct memory-to-memory transfer capabilities without requiring manipulation of the data by the CPU.

SUMMARY OF THE INVENTION

For a microprocessor containing a CPU and limited DMA controller capability which provides direct memory-to-I/O device transfers and vice versa but does not provide direct memory-to-memory transfers due to the inability of the DMA controller internal to the microprocessor chip to temporarily store data read from a memory device, the following circuit may be used to enable direct memory-to-memory transfers. This inventive circuit consists of a microprocessor, such as a Model V40 or a V50, connected to an address and data bus. An external register is connected to the data bus and controlled by the microprocessor to temporarily store data during direct memory-to-memory transfers.

Thus, using this configuration, a microprocessor having a relatively small die area by eliminating temporary registers internal to the DMA controller is still available to satisfy a typical user's needs; however, when a user also desires a direct memory-to-memory transfer capability, the microprocessor may be used in conjunction with an external register to provide this direct memory-to-memory capability.

DETAILED DESCRIPTION OF THE PREFERRED EMBODIMENT

Figure 1:
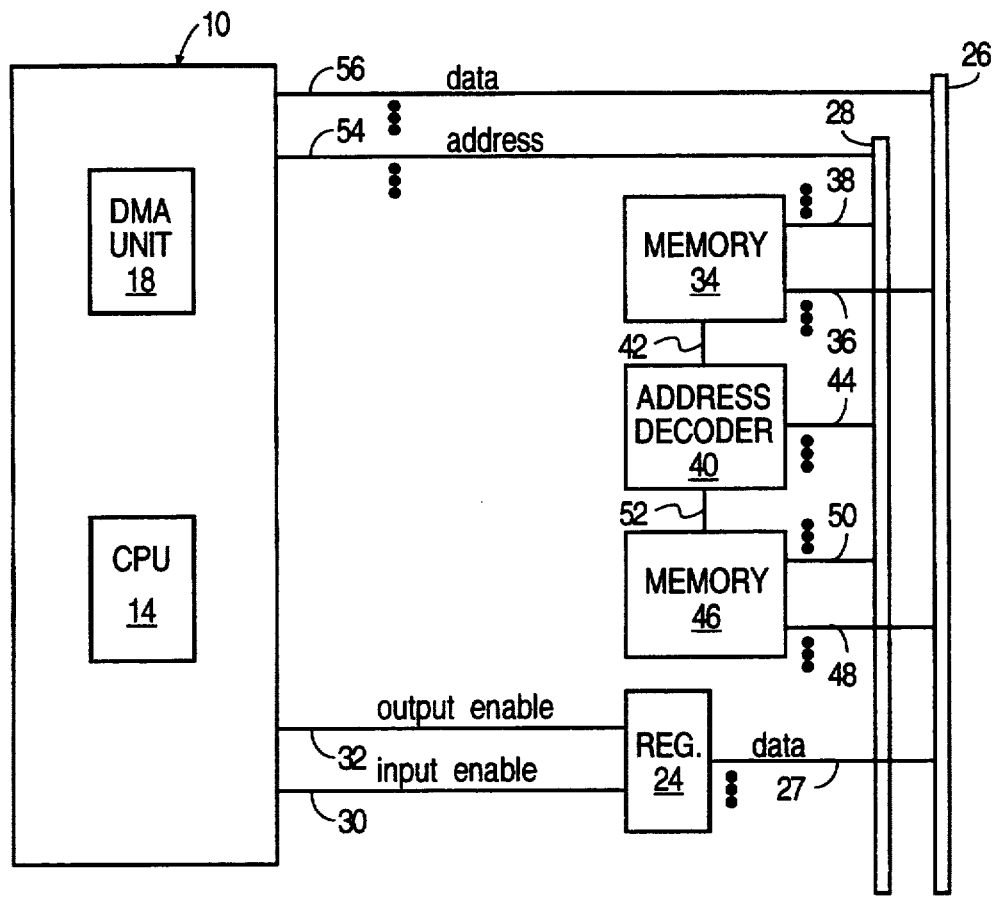
FIG. 1 shows a preferred embodiment of the invention.

FIG. 1 shows a preferred embodiment of the invention which includes microprocessor 10, which may be a Model V40, V50, or other microprocessor. A detailed description of the Model V40 and V50 microprocessors may be found in the data sheets for these devices obtained from NEC Electronics, Inc., incorporated herein by reference. Microprocessor 10 includes a central processing unit (CPU) 14 and a direct memory access (DMA) control unit 18. In a preferred embodiment, CPU 14 is a Model V20 or V30 CPU manufactured by NEC Electronics, Inc. DMA control unit 18, in a preferred embodiment, may be a modified μPD71071 DMA controller.

The Model V40 or V50 microprocessor contains a DMA control unit without a direct memory-to-memory transfer capability due to the lack of an internal register to temporarily store data while addressing the destination memory address location. Thus, the DMA unit in the Model V40 and V50 only provides direct memory-to-I/O transfers and I/O-to-memory transfers. Both of these transfers will be referred to herein as memory-to-I/O transfers.

To provide direct memory-to-memory capability, as shown in FIG. 1, an external 16-bit or 8-bit register 24 has data ports connected to data bus 26 via lines 27. One type of 8-bit register which may be used is the Model 74LS374. Data bus 26 may also act as an address bus if data and address bits are multiplexed. In the embodiment of FIG. 1, a separate address bus 28 is used. Control line 30 connects a data input enable pin of register 24 to an appropriate pin of microprocessor 10 for providing an enable signal to register 24 to enable register 24 to store the data on data bus 26. Control line 32 connects an output enable pin of register 24 to an appropriate pin of microprocessor 10 for providing an enable signal to register 24 to enable register 24 to output the temporarily stored data onto data bus 26.

A first memory device 34 is connected to data bus 26 via lines 36 and connected to address bus 28 via lines 38. A chip select pin of memory device 34 is connected to an output of address decoder 40 via line 42. Address input ports of address decoder 40 are coupled to appropriate address bus lines via lines 44 for providing chip select address signals.

A second memory device 46 is connected to data bus 26 via lines 48 and connected to address bus 28 via lines 50. A chip select pin of memory device 46 is connected to an output of address decoder 40 via line 52.

Microprocessor 10 has address and data ports connected to address bus 28 and data bus 26, respectively, via lines 54 and 56, assuming there is no multiplexing of address and data bits.

Enable and chip select signals provided by microprocessor 10 to register 24, memory 34, and memory 46 are generated by DMA unit 18, as necessary, to transfer data from memory 34 to memory 46 or visa versa in accordance with a data transfer program stored in DMA unit 18. In a typical DMA unit, separate channels within the DMA unit are used to control the transfer of data between one device and another device. For a channel within the DMA unit to control the transfer of data to or from a certain memory device, the following characteristics are typically programmed into the channel:

starting address for the transfer
transfer count
DMA operating mode
transfer size (byte/word units)

In the embodiment shown in FIG. 1, a first channel of DMA unit 18 is programmed to control the transfer of data into or out of first memory 34, while a second channel is programmed to control the transfer of data into or out of second memory 46. Additional channels in the DMA unit 18 may be used for memory-to-I/O data transfers (i.e., fly-by service).

To transfer data directly from memory device 34 to memory device 46, DMA unit 18 is requested to first directly transfer addressed data from the source memory device 34 into register 24 using a first channel of the DMA unit 18, where register 24 is effectively treated as an I/O device. On the next cycle, a second channel of the DMA unit 18 transfers the contents of register 24 to the addressed location in the destination memory device 46 to complete the memory-to-memory transfer. Again, register 24 is effectively treated as an I/O device.

Additionally, data may be transferred from one location in memory device 34 into another location in memory device 34, or data may be transferred from one location in memory device 46 into another location in memory device 46, using the same technique.

Thus, using the configuration of FIG. 1, two channels of the DMA unit 18 are used to achieve this memory-to-memory capability. In the Model V40 and V50 microprocessors, DMA unit 18 has four channels, thus leaving two channels available for fly-by service.

Figure 2:
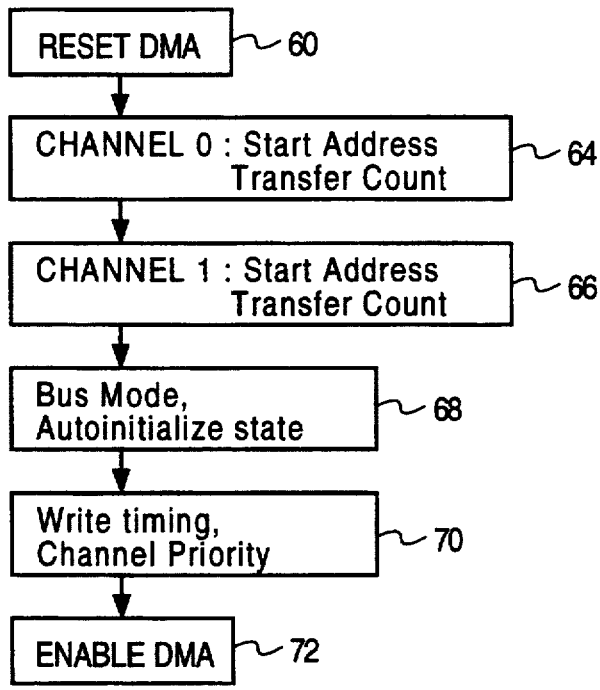
FIG. 2 shows an example of an initialization flow chart for a DMA unit within a microprocessor.

A microprocessor incorporating a DMA unit would normally be programmed during initialization procedures to initialize the channels within the DMA unit to perform this direct memory-to-memory transfer. FIG. 2 shows a flow diagram of a sample initialization procedure which may be easily written into software by one of ordinary skill in the art. First, in step 60, the various registers in the DMA unit are reset. In steps 64 and 66, the start addresses and transfer counts for the first and second channels are then loaded into the appropriate DMA unit registers. Next, in step 68, the DMA operating modes are selected. In the case of FIG. 2, which assumes the use of a Model V40 or V50 microprocessor, the bus mode and auto-initialize state are selected. Finally, in steps 70 and 72, the write timing and channel priority are then set followed by the enablement of the DMA unit.

During operation of microprocessor 10, while DMA unit 18 controls the transfer of data, whether memory-to-memory or memory-to-I/O, pursuant to a request to do so, CPU 14 may perform other operations not requiring data bus 26 or address bus 28. The DMA unit and the CPU communicate to determine which is to control the address bus and data bus.

DMA unit 18 within microprocessor 10, when connected as shown in FIG. 1, is particularly useful when transferring blocks of data from a hard disk drive to the main memory of a system so that the CPU may act on the new data in the main memory. Additionally, the DMA unit 18 is frequently used for extended memory management, where blocks of data are transferred from external RAM to the main memory.

Thus, a novel circuit and method for performing direct memory-to-memory transfers has been described.

The above-described invention may be applied to various types of microprocessors and is not limited to the Model V40 or V50 microprocessor. Additionally, although a DMA unit has been shown in FIG. 1 as being connected within a micro-processor, the DMA unit may be a separate unit or may be incorporated in an integrated circuit along with other types of circuitry.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. A circuit connected to a direct memory access unit formed as an integrated circuit, wherein said direct memory access unit does not have, internal to said integrated circuit, a temporary storage register for temporarily storing data during a memory-to-memory transfer, said circuit comprising:
   a bus directly connected to said integrated circuit;
   two or more memory devices connected to said bus in parallel with said integrated circuit; and
   an external register, external to said integrated circuit and connected to said bus in parallel with said memory devices, said external register having one or more control terminals coupled to receive control signals generated by said integrated circuit, said external register being controlled by said integrated circuit to temporarily store data only during a direct memory-to-memory transfer operation while one of said memory devices is being addressed, said integrated circuit operating during a memory-to-I/O transfer or I/O-to-memory transfer to directly transfer data between a memory and an I/O device and to control said external register to not store data for use during said memory-to-I/O transfer or I/O-to-memory transfer, wherein one or more of said memory devices are connected so as to be controlled by said integrated circuit to read or write data on said bus, wherein said direct memory access unit is contained within a microprocessor chip, and wherein said microprocessor is a Model V50 microprocessor.

2. The circuit of claim 1 wherein said direct memory access unit, first memory device, and second memory device are connected to a common address bus.

3. The circuit of claim 1 wherein said one or more control terminals of said external register comprise a data input enable terminal and an output enable terminal.

4. The circuit of claim 1 wherein said external register is solely dedicated to said direct memory-to-memory transfer operation.

5. A circuit connected to a direct memory access unit formed as an integrated circuit, wherein said direct memory access unit does not have, internal to said integrated circuit, a temporary storage register for temporarily storing data during a memory-to-memory transfer, said circuit comprising:

a bus directly connected to said integrated circuit;

two or more memory devices connected to said bus in parallel with said integrated circuit; and an external register, external to said integrated circuit and connected to said bus in parallel with said memory devices, said external register having one or more control terminals coupled to receive control signals generated by said integrated circuit, said external register being controlled by said integrated circuit to temporarily store data only during a direct memory-to-memory transfer operation while one of said memory devices is being addressed, said integrated circuit operating during a memory-to-I/O transfer or I/O-to-memory transfer to directly transfer data between a memory and an I/O device and to control said external register to not store data for use during said memory-to-I/O transfer or I/O-to-memory transfer, wherein one or more of said memory devices are connected so as to be controlled by said integrated circuit to read or write data on said bus, wherein said direct memory access unit is contained within a microprocessor chip, and wherein said microprocessor is a Model V40 microprocessor.

6. The circuit of claim 5 wherein said direct memory access unit, first memory device, and second memory device are connected to a common address bus.

7. The circuit of claim 5 wherein said one or more control terminals of said external register comprise a data input enable terminal and an output enable terminal.

8. The circuit of claim 5 wherein said external register is solely dedicated to said direct memory-to-memory transfer operation.

* * * * *